United States Patent
Bhogal et al.

(10) Patent No.: US 9,672,493 B2
(45) Date of Patent: Jun. 6, 2017

(54) SYSTEMS AND METHODS FOR DETECTING AND MANAGING RECURRING ELECTRONIC COMMUNICATIONS

(75) Inventors: Kulvir S. Bhogal, Fort Worth, TX (US); William Arthur Griffith, Austin, TX (US); Indran Naick, Cedar Park, TX (US); Mark William Talbot, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 721 days.

(21) Appl. No.: 13/353,740

(22) Filed: Jan. 19, 2012

(65) Prior Publication Data

US 2013/0191759 A1    Jul. 25, 2013

(51) Int. Cl.
*G06Q 10/10*    (2012.01)
*G06F 17/30*    (2006.01)
*G06F 3/048*    (2013.01)

(52) U.S. Cl.
CPC ............ *G06Q 10/10* (2013.01); *G06F 3/048* (2013.01); *G06F 17/30* (2013.01)

(58) Field of Classification Search
CPC ...... G06Q 10/107; G06Q 10/10; G06F 17/30; G06F 3/048
USPC ........................................................ 715/752
See application file for complete search history.

(56) References Cited

U.S. PATENT DOCUMENTS

| | | | |
|---|---|---|---|
| 5,909,677 A | 6/1999 | Broder et al. | |
| 6,057,841 A * | 5/2000 | Thurlow et al. | 715/809 |
| 6,072,942 A | 6/2000 | Stockwell et al. | |
| 6,092,101 A | 7/2000 | Birrell et al. | |
| 6,247,076 B1 | 6/2001 | Ono | |
| 6,757,713 B1 | 6/2004 | Ogilvie et al. | |
| 6,938,034 B1 * | 8/2005 | Kraft | G06F 17/2211 |
| 7,107,544 B1 * | 9/2006 | Luke | 715/752 |
| 7,395,315 B2 | 7/2008 | Colson et al. | |
| 7,546,535 B2 * | 6/2009 | Daniell | 715/752 |
| 7,555,524 B1 | 6/2009 | Hartman et al. | |
| 7,707,255 B2 * | 4/2010 | Satterfield et al. | 709/206 |
| 7,716,593 B2 * | 5/2010 | Durazo et al. | 715/752 |
| 7,844,666 B2 * | 11/2010 | Horvitz et al. | 709/206 |
| 7,849,141 B1 * | 12/2010 | Bellegarda et al. | 709/206 |
| 8,024,415 B2 * | 9/2011 | Horvitz et al. | 709/207 |

(Continued)

OTHER PUBLICATIONS

Buxton, David R. (Motorola); "Automatic Deletion of Text Message Store When Receiving Message from Same Source Number"; IPCOM000159854D, Oct. 31, 2007; 3 pages.

(Continued)

*Primary Examiner* — Jennifer To
*Assistant Examiner* — Hugo Molina
(74) *Attorney, Agent, or Firm* — Schmeiser, Olsen & Watts LLP (57) ABSTRACT

Described are systems and methods for detecting and processing recurring electronic communications. A graphical user interface (GUI) event is detected that includes a selection and a drag-and-drop of a first electronic communication object onto a second electronic communication object. A similarity is determined between the first and second electronic communication objects. At least one search criteria rule is automatically generated from the at least one similarity in response to detecting the GUI event.

14 Claims, 5 Drawing Sheets

(56) References Cited

U.S. PATENT DOCUMENTS

| | | | |
|---|---|---|---|
| 8,032,553 B2* | 10/2011 | Lippe et al. | 707/781 |
| 8,224,839 B2* | 7/2012 | Krupka et al. | 707/765 |
| 2002/0095464 A1* | 7/2002 | Meek | 709/206 |
| 2002/0178229 A1* | 11/2002 | Sinha et al. | 709/206 |
| 2006/0168046 A1* | 7/2006 | Qureshi | 709/206 |
| 2008/0168373 A1* | 7/2008 | Wilson | G06Q 10/107 715/769 |
| 2009/0070367 A1* | 3/2009 | Xu | G06F 17/2288 |
| 2009/0182788 A1* | 7/2009 | Chung et al. | 707/204 |
| 2009/0319506 A1* | 12/2009 | Ngan | G06Q 10/107 |
| 2010/0070448 A1* | 3/2010 | Omoigui | 706/47 |
| 2010/0208290 A1 | 8/2010 | Fan | |
| 2010/0211889 A1* | 8/2010 | Durazo et al. | 715/752 |
| 2011/0022982 A1* | 1/2011 | Takaoka et al. | 715/810 |
| 2011/0137921 A1* | 6/2011 | Inagaki | G06F 17/3069 707/749 |
| 2012/0124068 A1* | 5/2012 | Toyama | G06F 17/30011 707/758 |
| 2012/0151380 A1* | 6/2012 | Bishop | 715/752 |
| 2013/0007061 A1* | 1/2013 | Luomala | G06F 3/04883 707/776 |

OTHER PUBLICATIONS

Ming, Erin C. (IBM), "Classification of Electronic Messages Based on Content", Mar. 19, 2009; 5 pages.

Tran, Khanh (IBM), "Intelligent Duplicate Electronic Mail Content Deletion Manager", Mar. 25, 2009; 3 pages.

Patton, Tony. "Step-by-Step: Use rules to automate e-mail processing in Lotus notes", Jul. 22, 2003; 8 pages.

* cited by examiner

SYSTEMS AND METHODS FOR DETECTING AND MANAGING RECURRING ELECTRONIC COMMUNICATIONS

FIELD OF THE INVENTION

The present invention relates generally to electronic communications, and more specifically, to a system and method for detecting and managing recurring electronic communications.

BACKGROUND

Electronic mail, or email, is a well-known form of modern communication between computer users. Many email messages received by a user are recurring emails sent from the same sender, for example, weekly newsletters, coupon offers, and so on. Email recipients often ignore recurring emails, or allow them to accumulate in their electronic mailboxes.

BRIEF SUMMARY

In one aspect, a computer-implemented method is provided for detecting and processing recurring electronic communications. The method comprises detecting a graphical user interface (GUI) event that includes a selection and a drag-and-drop of a first electronic communication object onto a second electronic communication object; determining at least one similarity between the first and second electronic communication objects; and automatically generating at least one search criteria rule from the at least one similarity in response to detecting the GUI event.

In another aspect, a system is provided for managing recurring electronic communications. The system comprises an event management module that detects a graphical user interface (GUI) event that includes a selection and a drag-and-drop of a first electronic communication object onto a second electronic communication object; a pattern analyzer module that determines at least one similarity between the first and second electronic communication objects; and a rule generator that generates at least one search criteria rule from the at least one similarity in response to detecting the GUI event.

In another aspect, a computer program product is provided for detecting and processing recurring electronic communications. The computer program product comprises a computer readable storage medium having computer readable program code embodied therewith. The computer readable program code comprises computer readable program code configured to detect a graphical user interface (GUI) event that includes a selection and a drag-and-drop of a first electronic communication object onto a second electronic communication object; computer readable program code configured to determine at least one similarity between the first and second electronic communication objects; and computer readable program code configured to automatically generate at least one search criteria rule from the at least one similarity in response to detecting the GUI event.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

Figure 1:
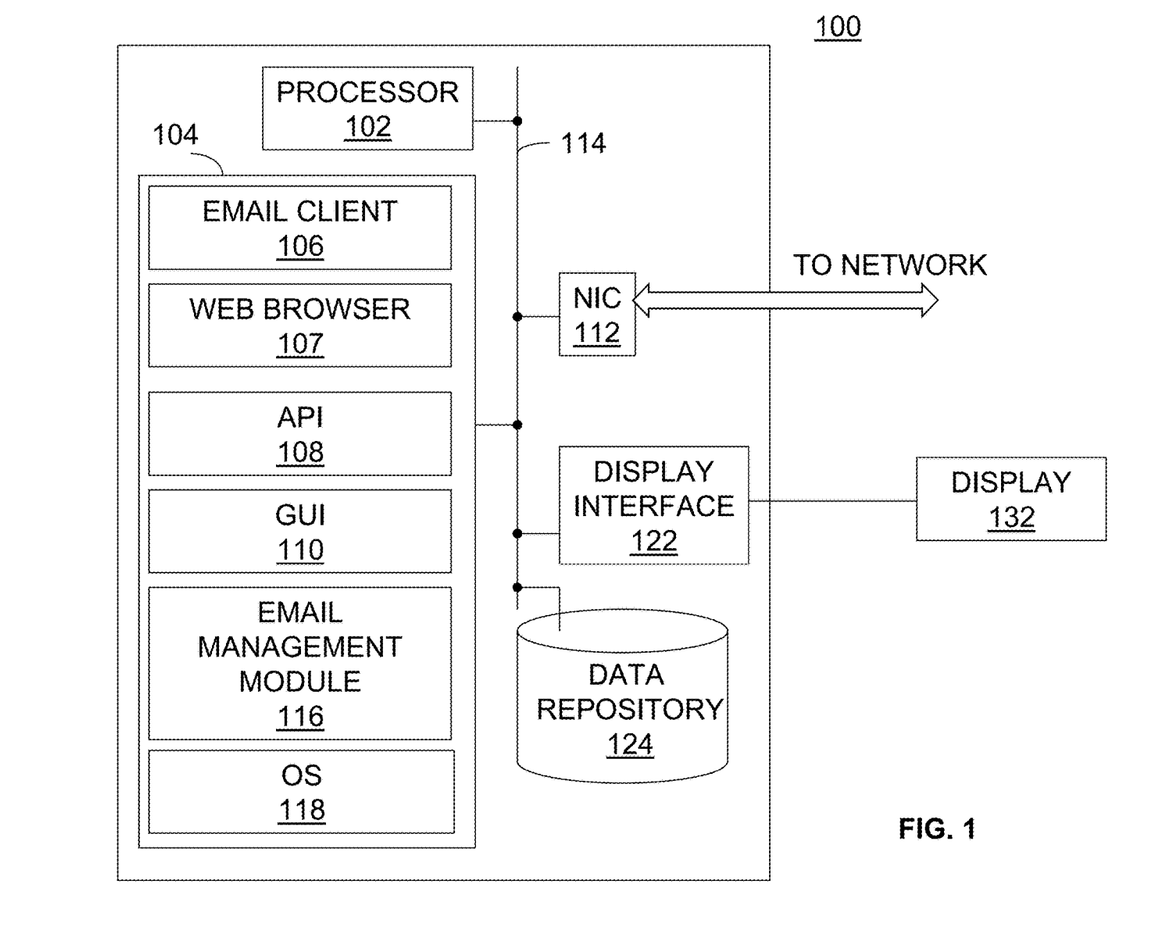
FIG. 1 is a block diagram of a computer platform that detects and processes recurring email messages, in accordance with an embodiment.

FIG. 1 is a block diagram of computer platform 100 that detects and processes recurring email messages, in accordance with an embodiment. Although email messages are referred to herein, the embodiments described herein can be applied to text messages, voicemail messages, or any other electronic communications presented to the display 132.

The computer system 100 includes a processor 102, a memory 104, a network interface controller (NIC) 112, a display interface 122, and a data repository 124, which can communicate with each other via a bus 114 and/or data connector, for example, a peripheral component interconnect (PCI) bus. The computer system 100 can include an email server or related application server, or be in communication with an email server or related application server via the NIC 112. The NIC 112 can include one or more adaptors for communicating with a network (not shown) such as a WAN, LAN, Internet, public network, private network, and the like, or via a direct connection.

The memory 104 can include volatile memory, for example, random access memory (RAM) and the like, and/or non-volatile memory, for example, read-only memory (ROM), flash memory, and the like. The memory 104 can include removable and/or non-removable storage media implemented in accordance with methods and technologies known to those of ordinary skill in the art for storing data. Stored in the memory 104 can include program code, such as program code of an operating system (OS) 118 executed by the processor 102.

The memory 104 also includes an email client 106, a web browser 107, an application program interface (API) 108, a graphical user interface (GUI) 110, and an email management module 116. The email client 106 can communicate with an email server, application server, and the like (not shown) to retrieve email or other electronic communications. Alternatively, the email client 106 can be implemented as a web application accessed via the web browser 107. The email client 106 can present the retrieved email messages to a display 132, e.g., a monitor, touchscreen, and the like, via the display interface 122 and/or store the retrieved email messages in the data repository 124. The email client 106 can include an email application, such as Lotus Notes® by International Business Machines Corporation. The email client 106 can perform other actions known to those of ordinary skill in the art related to the processing of email messages.

The API 108 permits programmers to extend the functionality of the email client 106 and/or other applications not shown but otherwise executing on the computer system 100 for generating and processing electronic communications, for example, an instant messaging application, a voice-over-IP application, and the like. The API 108 can be leveraged to extend the capabilities of the email client 106, for example, Lotus Notes®, to incorporate embodiments of the systems and methods of the present inventive concepts. A software programmer or other user can hook into the application, for example, by write programming code that registers with the email client 106 and is subsequently called by the email client 106 when an event occurs by which new programming code (e.g. the embodiment of this invention will be a set of computer programming instructions that are executed in response to the drag-and-drop operation) is executed. The email management module 116 can register with the email client as a listener of the event, for example, to detect a drag-and-drop GUI gesture from inside the email client program as described herein. In response to detecting an event, it can invoke elements of the email management module via the API 108.

The GUI 110 generates one or more windows for presenting applications at the display, for example, via the web browser 107, such as email messages generated or received at the email client 106. The GUI 110 can provide a drag-and-drop GUI operation known to those of ordinary skill in the art. For example, the displayed contents of one display window such as an email message, web document, HTML file, and the like can be moved using a mouse, stylus, finger, etc. to another display window.

The email management module 116 detects when a drag-and-drop operation is performed, for example, when an email message is dropped on another email message. In response, the email management module 116 identifies similarities between the two email messages, for example, applying pattern matching techniques that determine patterns in the email messages, for example, a same or similar sender, subject line, body, and so on, and generates a set of search criteria, or rules, from the similarity data. The email management module 116 can automatically produce email matching rules that filter through email messages or other electronic communications, searching for contents that match in accordance with the matching rules. The email management module 116 can perform a user-defined action specified by a given rule. The email matching rules can be known to those of ordinary skill in the art, and can be available for conventional email clients. The email management module 116 can access and produce commercially available email matching rules and/or user-defined rules for automatic generation in response to detecting events such as a drag-and-drop operation, as described herein. A set of rules automatically generated from the similarity data can be modified, for example, via an email client API, permitting a user to build upon the rules, for example, adding user-specific enhancements to the rules. The rules can be used to search for other received email messages that match similarity data of one or more stored email detection patterns, referred to as recurring email messages. The rules can be executed upon receipt of a new email message, or in accordance with user-determined criteria, for example, every evening or upon a inbox size threshold being reached. The email management module 116 can search the data repository 124 for older emails that also match a pattern to determine a user-specified action to take against recurring email messages such as deleting or archiving the messages.

Figure 2:
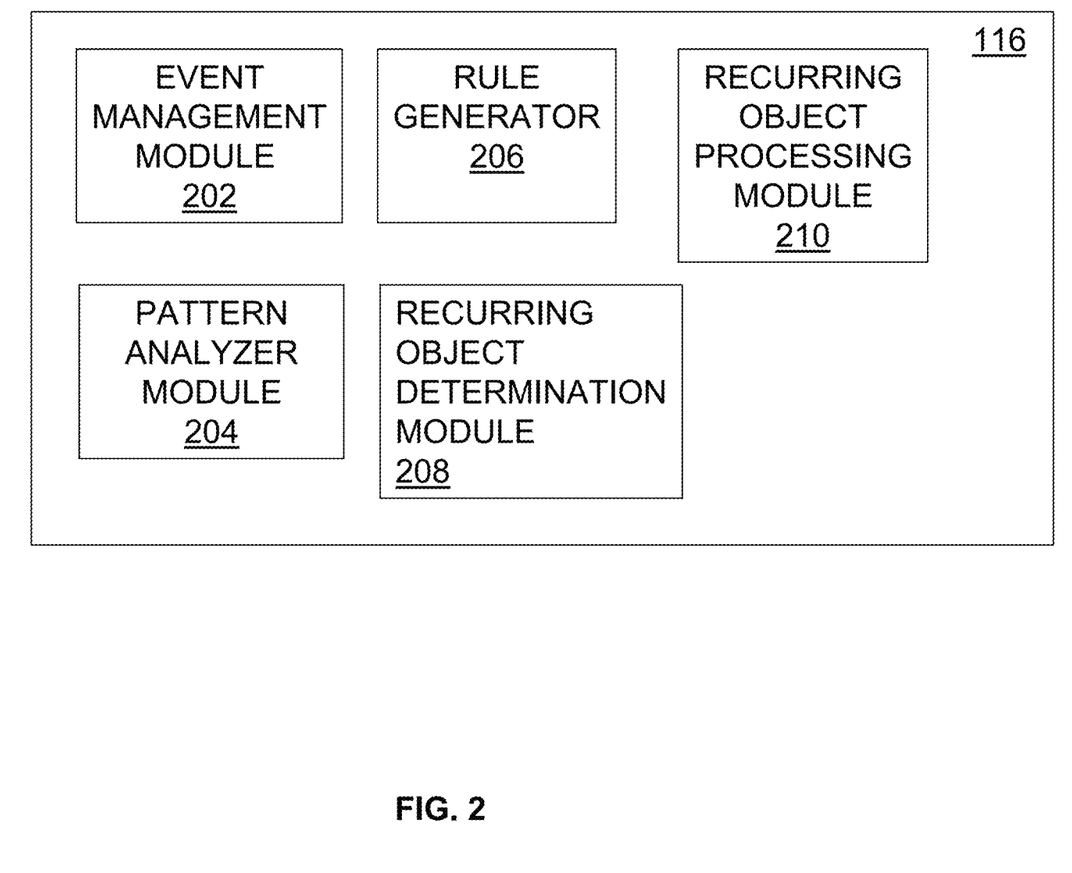
FIG. 2 is a block diagram of the email management module of FIG. 1, in accordance with an embodiment.

FIG. 2 is a block diagram of the email management module 116 of FIG. 1, in accordance with an embodiment. The email management module 116 includes an event management module 202, a pattern analyzer module 204, a rule generator 206, a recurring object determination module 208, and a recurring object processing module 210.

The email client 106, web browser 107, or related application can detect GUI events such as mouse movements, user selections, and the like, and notifies the event management module 202 of such events. When the event management module 202 is invoked in this manner, the objects participating in the drag-and-drop operation, for example, email messages, are compared to each other build a set of email rules. The email rules can be output to the email client 106 for storage and the like. The email management module 116 can subsequently return control to the email client 106 for processing email messages according to the features and functions of the email client 106. As described above, the email management module 116 can register with the email client 106 using the email client's APIs. An exemplary API 108 can contain a function for registering interest in an event that the email client can detect, such as a drag-and-drop event. Upon registering the email management module 116, the email client 106 can communicate with the email management module 116 when such events occur. In an embodiment, the email client sends a notification to the event management module 202 that a user has selected one email message or related electronic communication, for example, a mouse-click in the case of a computer monitor or a finger in the case of a touchscreen, and dragged the email message onto another email message or related electronic communication at the display 132. The event management module 202 in turn notifies the pattern analyzer module 204 of the event detection.

The pattern analyzer module 204 receives the contents of each of the two email messages identified in the drag-and-drop operation, in particular, the contents of the selected email message, also referred to as a source email message, and the contents of the target email message onto which the source email message is positioned at the display 132. The pattern analyzer module 204 performs a pattern analysis by comparing the contents of the source and target emails, respectively, and determining whether the contents include any similarities. The comparison results, referred to as similarity data, can be stored at the data repository 124 at the computer system 100 or stored at a persistent data store in communication with the computer platform 100 via the network 120. This stored similarity data can be used in a subsequent operation where the pattern analyzer module 204 can examine the stored similarity data, as well as other previously generated pattern data, in response to a receipt of a new incoming email message.

The rule generator 206 can create one or more rules from the similarity data. For example, a rule can be established that a recurring or similar email is defined as being from a same sender when the source email is dropped on a target email, and both emails are from the same sender. The rule generator 206 can apply a weighted technique or other similarity technique to determine a value of certain email contents, for example, that the email sender has a higher weight than the email body, since the probability of this being a recurring email is higher if the recurring email is sent from the same user. Another similarity technique can examine the subject of the email and remove common variable data such as dates or days of the week so that relevant keywords or other terms are used when the subject line of the similarity data is compared to the subject lines of previously received and stored email messages, or of subsequently received email messages, since recurring emails often include the same subject line minus the variable data. Therefore, by removing this variable data prior to performing a similarity match, a higher match percentage may be achieved, as high as a 100% match, and therefore improving the accuracy and use of the present inventive concepts. In this manner, rules produced by the rule generator 206 can be used to establish search criteria when detecting recurring email messages.

The rule generator 206 can also modify existing search criteria rules. For example, a pattern match may not be established in accordance with a rule defining that a new email message is required to have a same or similar layout and a corporate logo as the similarity data against which the new email message is compared. In this example, however, the new email message may have the same layout, but a different corporate logo. Here, the user can drag the new email message onto another email message, whereby the rule generator 206 can modify the rule to accept both corporate logos during a pattern analysis. Therefore, if a user receives a recurring email from a company, but that company has since changed its logo, then when the user performs a drag-and-drop operation with respect to this new email that possibly did not match a source email in accordance with previous rules since the logo was changed, then the previous rules can be updated to exclude the logo name, for example, in a similarity match.

The recurring object determination module 208 applies search criteria rules to other email messages or electronic communications to determine whether those email messages are deemed recurring email messages. In an embodiment, the electronic communications are previously stored communications, for example, email messages stored at an email server. In another embodiment, the electronic communications are received after the event management module 202 detects a drag-and-drop operation that initiates the generation of one or more search criteria rules. The recurring email messages can be fixed, periodic messages, for example, received weekly, monthly, and so on. Alternatively, the recurring email messages can be received at random intervals.

The recurring object processing module 210 can receive user criteria for processing electronic communications determined to be recurring electronic communications, and perform a corresponding action. For example, the recurring object processing module 210 can delete recurring email messages, or archive recurring email messages, or otherwise process the email messages in a manner known to those of ordinary skill in the art.

Figure 3:
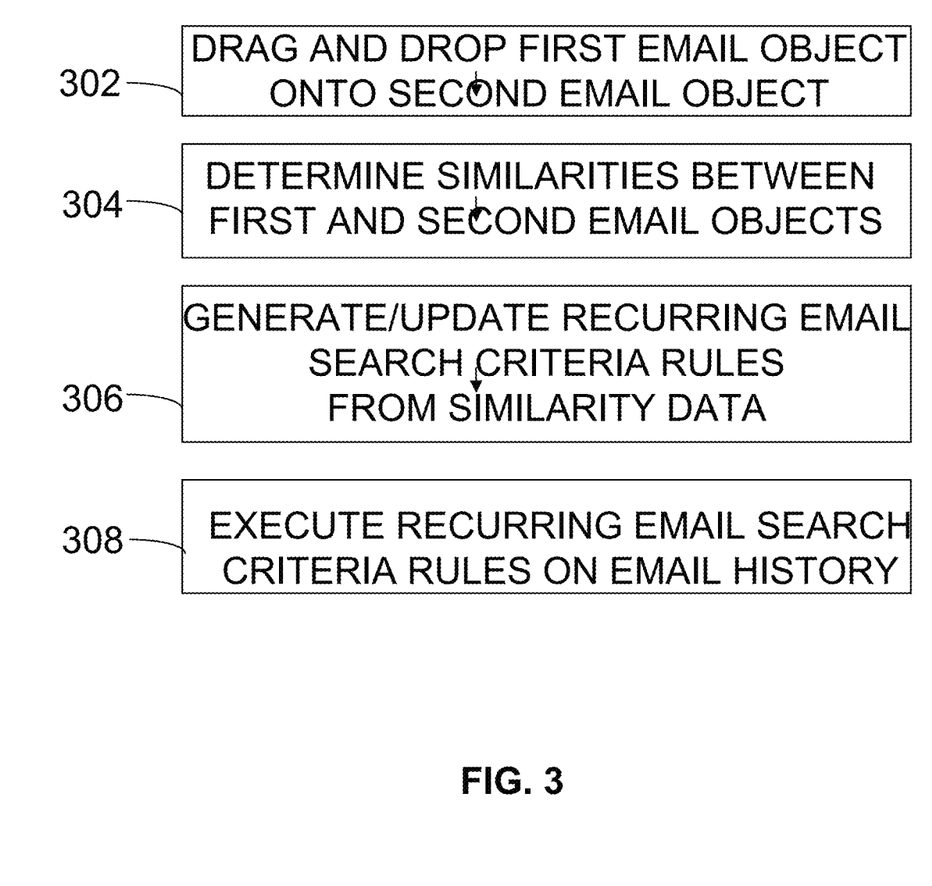
FIG. 3 is a flowchart of a method for determining recurring email messages, in accordance with an embodiment.

FIG. 3 is a flowchart of a method 300 for detecting and managing recurring email messages, in accordance with an embodiment. The method 300 can be governed by instructions that are stored in the memory 104, for example, the email management module 116, and can be executed by the processor 102 of the computer system 100 of FIG. 1, a hardware platform in communication with the computer system 100, or a combination thereof.

At block 302, a drag-and-drop operation is performed, whereby a first object is selected, then dragged-and-dropped onto a second object. The first and second objects are referred to in FIG. 3 as email objects. However, the first and second objects can also refer to text messages or other electronic communications presented to the display 132. The drag-and-drop operation can be performed in a GUI environment with the use of a mouse, pointer, or other computer input/output device. The GUI environment can include first and second display windows that present the first and second objects, respectively, on a touchscreen, monitor, or other display, where a mouse, finger, stylus, and the like can be used to drag the first object onto the second object.

At block 304, a comparison is made between the first and second objects for similarities in response to detecting the drag-and-drop event. A set of similarity data can be determined from the comparison results. For example, the first and second objects can be determined to be sent from a same email sender. The similarity data can be stored at the data repository 124 or other storage device. A comparison can be performed each time a drag-and-drop operation or related connection is detected between two or more objects at the display 132. For example, a user can drop a first email message onto a second email message to activate the pattern analyzer module 204, which generates a first set of similarity data. The user can later drop a third email message onto a fourth email message, whereby the pattern analyzer module 204 can generate a second set of similarity data that is applied to modify or refine a current set of rules. For example, a user can specify a rule that a recurring email pattern match must be at least a 90% match. Subsequently, an email sender changes the contents of a recurring email such that the recurring email pattern as compared with the initial drag-and-drop comparison results is determined to be a 75% match. Although the rule is not satisfied, the email receiver can view the new email on the display and visually establish that the new email is a recurring email even though elements of the new email are different than the source email to which it is compared. Here, the email receiver can drag the new email onto one of the previous emails to modify the pattern matching rules, for example, illustrated in the above-mentioned example regarding corporate logo differences. Expanding on this example, although the initial rules established that the corporate logo of a recurring email must be the same to be deemed a match, the rule can be modified to expunge this requirement based on the determination that the corporate logo changed. Therefore, by dragging the new email onto either the first or second email object, from which the similarities were determined, the associated rules get refined to exclude a logo check. The pattern results, more specifically, the similarity data, can be stored at the data repository 124.

At block 306, a set of recurring email search criteria rules can be generated from the similarity data. Existing search criteria rules can be updated in response to the generation of the similarity data.

At block 308, the recurring email search criteria rules can be applied to a set of email messages or other electronic communications subsequently received at the computer system 100 and/or email messages or other electronic communications stored at the data repository 124, mail server, or other storage device to detect any recurring email messages or other electronic communications.

One or more pattern analysis techniques can be applied to generate the recurring email search criteria rules from the similarity data. One technique can include a prioritization technique for improving the accuracy of a match determination. This technique can include assigning weight values to the similarity data. For example, after a user performs a drag-and-drop operation with respect to two email messages, the pattern analyzer module 204 can present the user with a set of matches and/or a percentage match to which the user can assign values or ranges of values to each determined match. For example, a value of 100% can be assigned to establish a match between sender's email address of the first and second email messages, and greater than (>) 80% can be assigned to establish a match between subject lines of the first and second email messages. The pattern analyzer module 204 can determine that a collective match is not established between the first and second email messages if the subject line criteria is met, i.e., greater than 80% match, but the sender criteria is not met, i.e., there is not a 100% match between the senders of the first and second email messages. In this example, the sender can modify the criteria rules to establish a collective match only when the subject lines are determined to have a greater than 80% match.

Another technique is to examine the subject of each email message and remove common variable data such as dates, days of the week, etc. Thus, when the email subject line is included in the similarity data, a search criteria rule can include subject line keywords as search criteria, since variable subject line terms, i.e., dates and the like, are discarded.

Referring to the abovementioned example, a rule can establish that a pattern match occurs when the email senders of two or more received email messages are the same and a set of keywords determined by a pattern analysis technique are the same.

Figure 4:
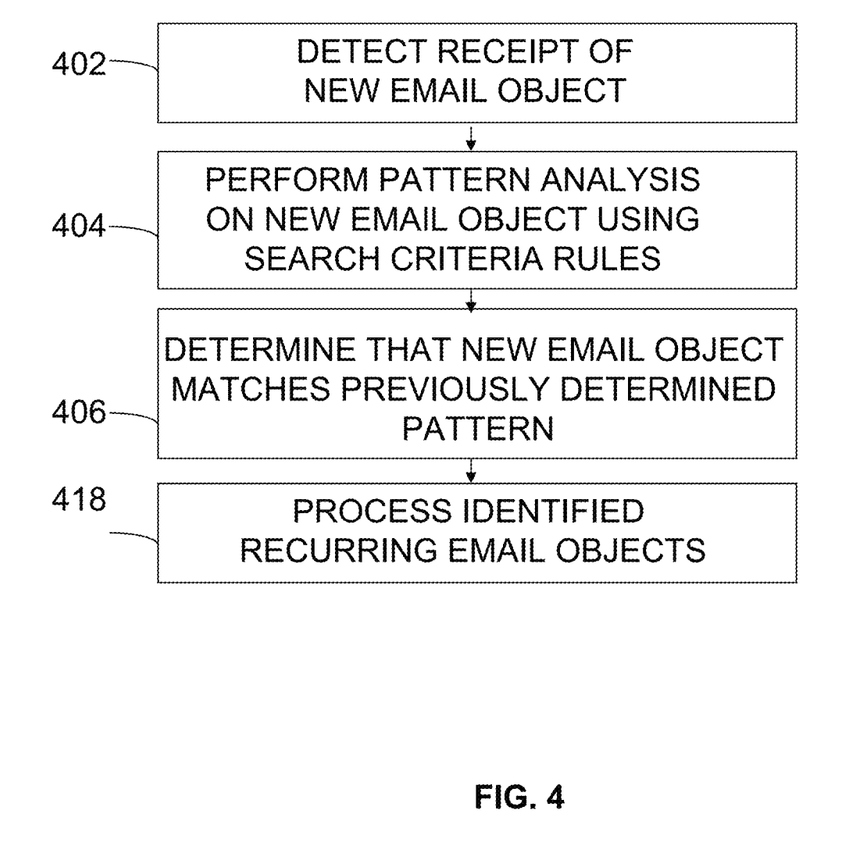
FIG. 4 is a flowchart of a method for processing recurring email messages, in accordance with an embodiment.

FIG. 4 is a flowchart of a method 400 for processing recurring email messages, in accordance with an embodiment. In describing the method 400, reference is made to the method 300.

At block 402, a new electronic communication object, for example, an email message, is detected.

At block 404, the pattern analyzer module 204 can perform a pattern analysis on the new electronic communication object to determine whether the new object complies with the recurring email search criteria rule generated at block 306. The pattern analysis is performed using the search criteria rules to determine whether the new object is a recurring object, i.e., a same or similar email message as other previously received email messages.

At block 406, a determination is made that the new object matches at least one pattern previously identified and stored. Referring to an abovementioned example, a user can observe at a display that two or more emails are similar other than a corporate logo, which is different. For example, a user can observe at a display that a new email message is sent from the same sender as the first and/or second email messages and should have been automatically processed as a recurring email. Since the logos are different, the matching rules established from the first and second email messages do not apply to the new email message. Here, the user can modify the rules by performing a drag-and-drop operation with respect to the new email message including a logo onto a previously received email message, i.e., the first or second email message, including another logo, and specify that the logo is irrelevant for matching purposes. Upon dropping the new email onto the first or second email message, a dialog window can be displayed that shows that the logos are different and, therefore, the new email does not match the first or second email message in accordance with the matching rules. The display can indicate for example, that there is a 95% match and provide options for the user to accept the 95% match, where the user can reduce the matching threshold value from a previous threshold value, i.e., 100%, to a new threshold value, i.e., 95%. Alternatively, the user can ignore the comparison, or accept the new logo, and so on.

Alternatively, if a determination is made that the new object does not match any patterns in accordance with a current set of rules, no automatic action need be applied. Here, the email can be processed according to conventional email program features. Here, the recurring email search criteria rule generated at block 306 can be modified based on the detected new action and similarity data generated in response to the detected new action.

If the new email object matches at least one stored pattern, then at block 408, objects such as older email messages that match the pattern can be deleted, archived, or otherwise processed as specified according to user criteria. The new email object can be retained.

Figure 5:
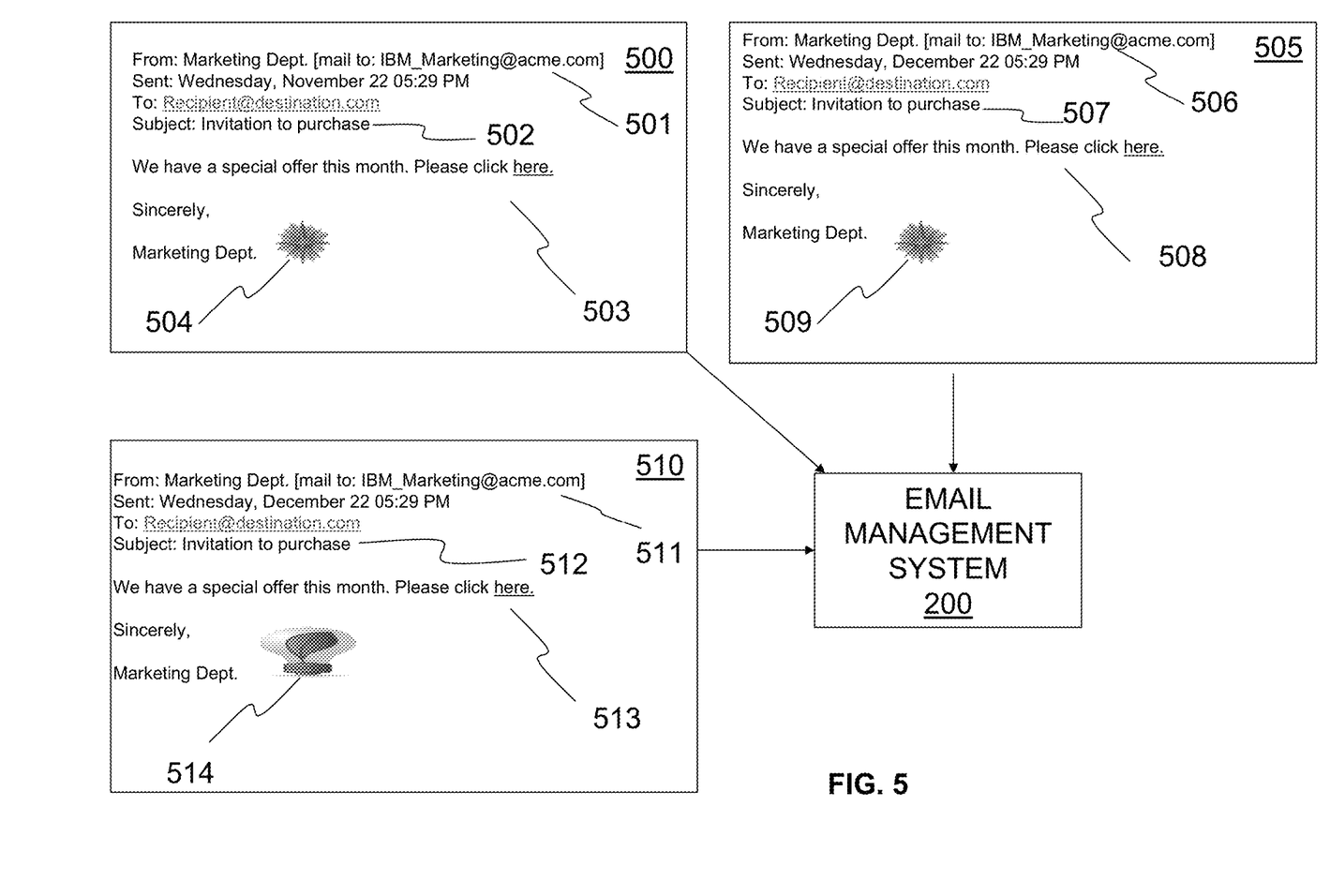
FIG. 5 is a diagram illustrating an email management system generating a search criteria rule from a pattern analysis performed between two email messages, in accordance with an embodiment.

FIG. 5 is a diagram illustrating an email management system 200 generating a search criteria rule 520 in response to a pattern analysis performed between received email messages, in accordance with an embodiment. The email management system 200 can be similar to the computer system 100, and can include the email management module 116 described in FIGS. 1-3.

A relationship can be established between the first email message 500 and the second email message 505, for example, by dragging and dropping the first email message 500 onto the second email message 505 at a display.

The email management system 200 can perform a pattern analysis on the first and second email messages 500, 505 and determine that a sender 501 of the first email message 500 and a sender 506 of the second email message 505 are the same. The pattern analysis can also determine that a subject line 502 of the first email message 500 and a subject line 507 of the second email message 505 are the same. The pattern analysis can also determine that a body 503 of the first email message 500 and a body 507 of the second email message 505 are the same. Finally, the pattern analysis can also determine that a company logo 504 of the first email message 500 and a company logo 509 of the second email message 505 are the same.

The email management system 200 can generate a search criteria rule based on the pattern analysis results. For example, the search criteria rule can establish that a subsequently received email message 510 is deemed a recurring email message if a pattern analysis performed on subsequently received email message 510 indicates that the sender 511, the subject line 512, the body 513, and the company logo 514 of the subsequently received email message 510 matches the pattern analysis results generated from the comparison between first and second email messages 500, 505.

In this example, the majority of matches can be determined by the sender 511 and/or the subject line 512 being the same, exclusive of variable data such as dates, the user can specify one or more "auto set rules" without any user involvement, i.e., the user is not prompted with a dialog box but rather the email management module 116 executes the rules automatically in the background. However, for elements such as detecting logo changes, which are generally less common, the user may choose via preferences to be prompted for the matching criteria such that upon dragging a source email onto a target email, a dialog box can be presented with a list of email elements, e.g., subject line, sender, logo, and so on, that are matches. The user can also be presented with rules that will be generated upon the user clicking "ok" in the dialog box. For example, the dialog box can display the email body text in a side-by-side format with other email body text, and identify content that is different by a strike-through or "X" over the non-matching content. The user could then click this text and say "ignore" such that now the body text is a 100% match. For example, assume that the text body is 100 words long and one image, i.e., a logo. When the new email comes in with a new logo, a match is determined between the body's 100 words, but the logo does not match. The predetermined match percentage requirement can be reduced from 100% to 99%. However, when the user selects an "ignore logo" field at the display, then the match value can be increased to its original value, i.e., 100%.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer-implemented method for detecting and processing recurring electronic communications, comprising:

detecting a graphical user interface (GUI) event that includes a user selection and drag-and-drop of a first electronic communication object onto a second electronic communication object;

performing a pattern analysis on two or more previously received electronic communication objects by determining at least one similarity between displayed content of the first electronic communication object and displayed content of the second electronic communication object, wherein the determination occurs in response to completion of the drag-and-drop of the first electronic communication object onto the second electronic communication object;

storing pattern matching results produced in response to performing the pattern analysis, wherein the pattern matching results are stored via an email client application programming interface (API);

defining the determined at least one similarity between displayed content of the first electronic communication object and displayed content of the second electronic communication object as similarity data;

automatically generating at least one search criteria rule from the defined similarity data between the displayed content of the first electronic communication object and the second electronic communication object in response to detecting the GUI event;

detecting receipt of a third electronic communication object;

automatically activating the at least one search criteria rule generated from the defined similarity data between the displayed content of the first electronic communication object and the second electronic communication object to the detected third electronic communication object to determine whether the third electronic communication object includes data that matches the similarity data;

comparing the third electronic communication object and the pattern matching results to determine at least one similarity between the third electronic communication object and the pattern matching results;

updating the generated at least one search criteria rule from the similarity data, wherein modifying the generated at least one search criteria rule in response to the third electronic communication object not matching an element of the at least one similarity by performing a GUI event that includes a selection and a drag-and-drop of a third electronic communication object onto the first or second electronic communication object; and executing the updated at least one search criteria rule onto a history of electronic communication objects to determine electronic communication objects that match the similarity data of the updated at least one search criteria rule.

2. The computer-implemented method of claim 1, further comprising:

performing a search of a storage repository for stored electronic communication objects that include data that matches the at least one similarity in accordance with the at least one search criteria rule; and applying an automatic user-defined action against the stored electronic communication objects.

3. The computer-implemented method of claim 2, wherein the automatic user-defined action includes archiving or deleting the stored electronic communication objects.

4. The computer-implemented method of claim 1, wherein the first and second electronic communication objects include email messages.

5. The computer-implemented method of claim 1, wherein generating the at least one search criteria rule includes applying a weighted technique to the determined at least one similarity.

6. The computer-implemented method of claim 1, further comprising: performing a search for stored electronic communication objects in accordance with the at least one search criteria rule to determine similarities between the stored electronic communication objects and the stored pattern matching results.

7. The computer-implemented method of claim 1, wherein the GUI event is detected by an email client.

8. A system for detecting and managing recurring electronic communications, comprising:

a processor;

a memory storing executable computer program code instructions that, when executed by the processor causes to perform:

an event management module that detects a graphical user interface (GUI) event that includes a user selection and drag-and-drop of a first electronic communication object onto a second electronic communication object;

a pattern analyzer module that performs a pattern analysis on two or more previously received electronic communication objects by determining at least one similarity, between displayed content of the first electronic communication object and displayed content of the second electronic communication object, wherein the determination occurs in response to completion of the drag-and-drop of the first electronic communication object onto the second electronic communication object, wherein the pattern analyzer module that defines the determined at least one similarity between displayed content of the first electronic communication object and displayed content of the second electronic communication object as similarity data;

an email client application programming interface (API) that stores the pattern matching results produced in response to performing the pattern analysis;

a rule generator that automatically generates at least one search criteria rule from the defined similarity data between the displayed content of the first electronic communication object and second electronic communication object in response to detecting the GUI event; and an email management module that detects receipt of a third electronic communication object;

a recurring object determination module that automatically activates the at least one search criteria rule generated from the defined similarity data between the displayed content of the first electronic communication object and the second electronic communication object to the detected third communication object to determine whether the third electronic communication object includes data that matches the similarity data;

wherein the pattern analyzer module that compares the third electronic communication object and the pattern matching results to determine at least one similarity between the third electronic communication object and the pattern matching results;

wherein the rule generator that updates the generated at least one search criteria rule from the similarity data, wherein modifies the generated at least one search criteria rule in response to the third electronic communication object not matching an element of the at least one similarity by performing a GUI event that includes a selection and a drag-and-drop of a third electronic communication object onto the first or second electronic communication object; and wherein the pattern analyzer module that executes the updated at least one search criteria rule onto a history of electronic communication objects to determine electronic communication objects that match the similarity data of the updated at least one search criteria rule.

9. The system of claim 8, wherein the recurring object determination module performs a search of a storage repository for stored electronic communication objects having elements that match the at least one similarity in accordance with the at least one search criteria rule.

10. The system of claim 8, wherein the rule generator applies a weighted technique to the at least one similarity.

11. The system of claim 8, further comprising a recurring object processing module that receives user criteria for processing electronic communications determined to be recurring electronic communications, and performs a corresponding action.

12. The system of claim 11, wherein the corresponding action includes archiving or deleting the recurring electronic communication objects at a storage repository.

13. A computer program product for detecting and processing recurring electronic communications, comprising:

a non-transitory computer readable storage medium having computer readable program code embodied therewith, that when executed by a processor the computer readable program code is configured to:

detect a graphical user interface (GUI) event that includes a selection and a drag-and-drop of a first electronic communication object onto a second electronic communication object;

perform a pattern analysis on two or more previously received electronic communication objects by determining at least one similarity between displayed content of the first electronic communication object and displayed content of the second electronic communication object, wherein the determination occurs in response to completion of the drag-and-drop of the first electronic communication object onto the second electronic communication object;

store pattern matching results produced in response to performing the pattern analysis, wherein the pattern matching results are stored via an email client application programming interface (API);

define the determined at least one similarity between displayed content of the first electronic communication object and displayed content of the second electronic communication object as similarity data;

automatically generate at least one search criteria rule from the defined similarity data between the displayed content of the first electronic communication object and the second electronic communication object in response to detecting the GUI event;

detect receipt of a third electronic communication object;

automatically activate the at least one search criteria rule generated from the defined similarity data between the displayed content of the first electronic communication object and the second electronic communication object to the detected third electronic communication object to determine whether the third electronic communication object includes data that matches the similarity data;

compare the third electronic communication object and the pattern matching results to determine at least one similarity between the third electronic communication object and the pattern matching results;

update the generated at least one search criteria rule from the similarity data, wherein modifies the generated at least one search criteria rule in response to the third electronic communication object not matching an element of the at least one similarity by performing a GUI event that includes a selection and a drag-and-drop of a third electronic communication object onto the first or second electronic communication object; and execute the updated at least one search criteria rule onto a history of electronic communication objects to determine electronic communication objects that match the similarity data of the updated at least one search criteria rule.

14. The computer program product of claim 13, further comprises:

perform a search of a storage repository for stored electronic communication objects that include data that matches the at least one similarity in accordance with the at least one search criteria rule; and apply an automatic user-defined action against the stored electronic communication objects.

* * * * *